United States Patent Office 3,477,859
Patented Nov. 11, 1969

3,477,859
PROCESS FOR IMPROVING THE COLOR OF COMMINUTED MEAT
William Lewis Brown and Morton Lee Schmucker, Ottumwa, Iowa, assignors to John Morrell & Co., a corporation of Delaware
No Drawing. Continuation of application Ser. No. 506,605, Nov. 5, 1965. This application Sept. 1, 1967, Ser. No. 665,184
Int. Cl. A23b 1/04
U.S. Cl. 99—159    3 Claims

ABSTRACT OF THE DISCLOSURE

A method for accelerating coloring development during the curing of meat. The method comprises adding to ground meat prior to cooking and curing, a mixture of an ascorbate and a citrate in addition to the usual curing salts and flavoring agents and without further curing treatment, smoking the meat containing this mixture. The mixture is added in a concentration of from 0.03% to 0.07% by weight of the meat and contains from about 30% to about 80% of an ascorbate and about from 20% to 70% of a citrate.

---

This application is a continuation of application Ser. No. 506,605 filed Nov. 5, 1965, now abandoned which was a continuation-in-part of Ser. No. 311,623, filed Sept. 26, 1963, now abandoned.

This invention relates to the curing of meat and in particular to the curing of meat products made from comminuted meat such as frankfurters and sausages. In one of its more particular aspects this invention relates to a method for accelerating color development during the curing of meat and improving the retention of color development during subsequent storage and display of the cured meat.

The problems entailed in proper color development of meats are probably most acute in the manufacture of cooked, cured and comminuted meat products such as weiners or frankfurters, bologna and sausages which require more handling and present more surface area to the deleterious effects of light and oxygen than in the case of other meats.

When a slow curing process is utilized in the curing of such meat products the pH, enzyme activity and the fundamental properties of meat combine to produce conditions favorable to color development reactions. When the curing is accelerated, however, as is most often the case in the meat packing industry today, the effects of these favorable natural conditions are materially reduced, and the color of the meat is not as desirable as that produced in a slow cure. Accordingly, various reagents and compositions have been used or proposed for use to aid in developing the desired color. In particular antioxidants such as ascorbic acid and its derivatives have come into wide usage. These and other antioxidants are commonly utilized in the processing steps, such as the cooking, curing and comminuting steps of preparing meat products. The role of ascorbate in color development in meats is covered in U.S. Patent No. 2,541,572 to Harold L. Coleman and Albert H. Steffen, U.S. Patent No. 2,553,533 to Stephen L. Komarik and Lloyd A. Hall, U.S. Patent No. 2,739,899 to Clifford M. Hollenbeck and U.S. Patent No. 2,977,235 to Edward J. Hanus.

It is an object of this invention to provide an improved process for curing comminuted meats.

Another object of this invention is to provide a process by means of which comminuted meats can be cured in a shorter period of time with optimum color development.

Another object of this invention is to provide a process for ensuring that the color developed in comminuted, cooked and cured meat products is maintained over an extended period of time during storage and display.

Other objects and advantages of this invention will become apparent in the course of the following detailed disclosure and description.

It has now been found that the foregoing objects can be accomplished by means of a process which comprises adding to comminuted meat prior to cooking and curing a mixture of an ascorbate and a citrate in addition to the usual curing salts and flavoring agents and curing the meat containing this mixture. The mixture of ascorbate and citrate is thus maintained in intimate contact with the meat throughout the curing cycle in contrast to prior art processes in which an antioxidant mixture was merely used as a surface treatment of meat pieces. This maintenance of contact throughout the curing cycle results in faster, more uniform color development and ensures that the color developed in the meat is maintained over an extended period of time during subsequent storage and display.

The ascorbate can be exemplified by ascorbic acid, erythorbic acid and the water soluble salts thereof, such as sodium ascorbate and sodium erythorbate. The term "ascorbate" will be used throughout this specification to denote any of these compounds.

The citrate can be citric acid or any of its water soluble salts, such as sodium citrate. The term "citrate" will be used to denote any of these compounds.

Mixtures of ascorbate and citrate which have been found useful include compositions in which the citrate is present in a proportion of about from 20% to 70% by weight of the mixture of ascorbate and citrate. Compositions in which the ascorbate and citrate are present in substantially equal parts by weight are preferred.

In order to effect the objects of this invention it has been found that the mixture of ascorbate and citrate should be added to the meat in a concentration of about from 0.03% to 0.07% by weight of the meat.

This invention will be better understood by reference to the following illustrative examples which, however, are not intended to limit the scope of this invention which is defined in the claims appended hereto.

Example 1

An emulsion having the following formulation was used:

| | Lb. |
|---|---|
| Boneless cow | 450 |
| Pork regular trimmings | 550 |
| Corn syrup | 30 |
| Water and ice | 320 |
| Salt, cure, spices | 48 |

The mixture for the pork regular trimming was chopped for 1 to 2 minutes. The regular trimmings were then added and the mixture chopped at 45° F. The emulsion was then divided into two equal portions. To one portion was added a mixture of 2 ounces sodium erythorbate and 2 ounces citric acid. To the other portion 4 ounces sodium erythorbate was added. The chop was then continued for ½ minute. The emulsions were then put through a Mince Master, stuffed, linked and processed in a smoke-house as follows: 45 minutes at 140° F., 60 minutes at 160° F., then 170° F. to an internal temperature of 146° F. The emulsions were then put through a 160° F. water spray to an internal temperature of 152° F. and then subjected to a cold water shower for 10 minutes followed by a blast chilling.

Samples of each emulsion were checked repeatedly during processing for color development, the colors being rated on and defined by means of a Munsell Color Disk. Nickerson, D., "Color Measurement and Its Application to the Grading of Agricultural Products," U.S. Department of Agriculture, 1946. The results are summarized in Table 1.

TABLE 1

| 4 oz. Erythorbate per 500 lb. Batch | | Munsell Color Ratings | | Munsell Color Ratings | | 2 oz. Erythorbate plus 2 oz. Citrate per 500 lb. Batch | |
|---|---|---|---|---|---|---|---|
| Time, min. | Internal Temp., °F. | Red | White | Red | White | Time, min. | Internal Temp., °F. |
| 75 | 118 | 55 | 18 | 55 | 18 | 60 | 115 |
| 90 | 122 | 57 | 16 | 57 | 15 | 75 | 118 |
| 130 | 147 | 60 | 14 | 59 | 14 | 90 | 122 |
| 133 | 154 | 61 | 13 | 61 | 12 | 105 | 130 |

From these data it can be seen that the mixture of ascorbate and citric acid produces a color comparable to ascorbate alone in a shorter period of time and at a lower internal temperature.

Example 2

An emulsion having the following formulation was prepared:

| | Lb. |
|---|---|
| Boneless cow | 350 |
| Beef navel ends | 650 |
| Corn syrup | 30 |
| Water and ice | 320 |
| Salt, cure, and spices | 50 |

All ingredients were chopped until the emulsion temperature reached 45° F. One-half minute before the end of chop the emulsion was divided into two equal portions. To one portion was added a mixture of 2 ounces sodium erythorbate and 2 ounces critic acid. To the other portion 4 ounces sodium erythorbate was added. The mixtures were then put through a Mince Master, stuffed, linked and processed in a smoke-house as follows: 1½ hours at 120° F., ½ hour at 140° F.; ½ hour at 160° F.; then 170° F. to an internal temperature of 146° F. followed by a 165° F. water spray to an internal temperature of 152° F. The emulsions were then passed into a cold water shower for 10 minutes, followed by blast chilling.

The Munsell color readings of the finished frankfurters are shown in Table 2.

TABLE 2

| | Red | Yellow | Black | White |
|---|---|---|---|---|
| Franks with erythorbate | 63 | 12 | 9 | 16 |
| Franks with erythorbate plus citrate | 69 | 10 | 9 | 12 |

It is readily observable that the franks containing the mixture of sodium erythorbate and citric acid were in fact a better color than identical franks containing erythorbate alone. The improvement in red color was also evident visually to a trained panel of color checkers.

Example 3

Emulsions having the following formulations were used:

| | | |
|---|---|---|
| Boneless cow | 80 lb. | 80 lb. |
| Beef navel ends | 100 lb. | 100 lb. |
| Beef cheek meat | 100 lb. | 100 lb. |
| Pork jowl | 150 lb. | 150 lb. |
| Pork head skin trimmings | 70 lb. | 70 lb. |
| Corn syrup | 15 lb. | 15 lb. |
| Water and ice | 150 lb. | 150 lb. |
| Salt, cure and spices | 24 lb. | 24 lb. |
| Sodium erythorbate | 4 oz. | 2 oz. |
| Citric acid | None | 2 oz. |

The boneless cow, beef cheeks, syrup, water, salt and spices were chopped for 1 to 2 minutes. The rest of the meats were then added and chopped to an emulsion temperature of 45° F. Erythorbate or erythorbate plus citric acid was added ½ minute before end of chop, out chop and into Mince Master, stuffed, linked and processed in a smoke-house as follows: 1 hour at 120° F.; ½ hour at 140° F.; ½ hour at 160° F.; then 165° F. to an internal temperature of 146° F.; a 165° F. water spray to an internal temperature of 152° F. followed by a cold water spray for 10 minutes, then to blast chill.

Munsell color readings on the finished franks are set out in Table 3.

TABLE 3

| | Red | Yellow | Black | White |
|---|---|---|---|---|
| Franks with erythorbate | 59 | 13 | 9 | 19 |
| Franks with erythorbate plus citrate | 63 | 12 | 12 | 13 |

Again there was obtained a more desirable, redder color with the erythorbate and citrate mixture than by using the erythorbate alone. The marked improvement is thus to occur with various formulas and various ingredients.

Example 4

An emulsion having the following formulation was prepared:

| | | |
|---|---|---|
| Boneless cow | 225 lb. | 225 lb. |
| Pork regular trimmings | 275 lb. | 275 lb. |
| Corn syrup | 15 lb. | 15 lb. |
| Water and ice | 150 lb. | 150 lb. |
| Salt, cure and spices | 24 lb. | 24 lb. |
| Erythorbate | 4 oz. | 2 oz. |
| Citric acid | None | 2 oz. |

The meat emulsions were processed as in Example 1. Munsell color readings on the finished franks are summarized in Table 4.

TABLE 4

| | Red | Yellow | Black | White |
|---|---|---|---|---|
| Franks with erythorbate | 59 | 8 | 7 | 26 |
| Franks with erythorbate plus citrate | 62 | 9 | 7 | 22 |

For the reason that bologna is processed is a considerably larger diameter casing than franks, and since the time/temperature relationships during processing are therefore considerably different, the effects of the use of an ascorbate-citrate mixture are less pronounced but still definitely measurable.

Example 5

Emulsions having the following compositions were used:

| | | |
|---|---|---|
| Boneless cow | 250 lb. | 250 lb. |
| Pork head meat | 125 lb. | 125 lb. |
| Pork jowl | 125 lb. | 125 lb. |
| Corn syrup solids | 12 lb. | 12 lb. |
| Water and ice | 110 lb. | 110 lb. |
| Salt, cure and spices | 22 lb. | 22 lb. |
| Sodium erythorbate | None | 2 oz. |
| Citric acid | do | 2 oz. |

The boneless cow, corn syrups solids, water, salt, cure and spices were chopped for 3 minutes, then the pork head meat added and chopped for 3 minutes, then jowl added and chopped for 3 minutes. Where sodium erythorbate plus citric acid was used, it was added ½ minute before end of chop, out chop to stuffing, then processed in a smoke-house as follows: 1 hours at 130° F.; 1 hour at 150° F.; then hold 180° F. to an internal temperature of 152° F.; then cold water spray for ¾ hour, then to blast chill. Munsell color readings on the finished bologna are set out in Table 5.

TABLE 5

|  | Red | Yellow | Black | White |
|---|---|---|---|---|
| Plain bologna | 51 | 9 | 6 | 34 |
| Bologna plus erythorbate plus citrate | 54 | 9 | 6 | 31 |

Example 6

This example illustrates the advantages of the process of this invention upon meats in storage. The meat product was prepared and processed as in the preceding examples.

| Boneless cow | 225 lb | 225 lb |
|---|---|---|
| Pork regular trimmings | 275 lb | 275 lb |
| Corn syrup | 15 lb | 15 lb |
| Water and ice | 150 lb | 150 lb |
| Salt, cure, spices | 24 lb | 24 lb |
| Sodium erythorbate | 4 oz | 2 oz |
| Citric acid | None | 2 oz |

Internal colors were checked at various storage ages (storage at 45° F. to 50° F.) which are shown in Table 6. In 4 out of 5 storage periods (0 to 12 days) the erythorbate plus citrate treated frankfurters were scored higher than the control by the Munsell color disk method of evaluation.

TABLE 6.—FRANKFURTERS

| | Ascorbate | | Ascorbate + citric acid | |
|---|---|---|---|---|
| | Munsell color | | Munsell color | |
| Storage Age | Red | White | Red | White |
| 0 days (fresh) | 53 | 25 | 55 | 25 |
| 1 | 58 | 20 | 57 | 22 |
| 4 | 57 | 21 | 58 | 21 |
| 8 | 56 | 22 | 58 | 20 |
| 12 | 55 | 23 | 57 | 22 |

It will be appreciated that a great variety of meats are commonly used in weiners or frankfurters, for example boneless cow, beef navel, beef cheek, pork regular trimmings, pork jowl, pork head skin trims, veal, mutton and others and in various proportions with each other. The same holds true for bologna. Standard formulation procedures may include grinding, chopping, roto-cutting, Mince Master, and/or combinations of these. Processing temperatures can cover any temperatures from 100° F. to 200° F. and may consist of a single temperature or any combination of times and temperatures to give the desired internal temperature of the product. The product may move continuously through processing or be held between various steps of formulation, stuffing or processing. Such holding times can vary from minutes to a day or more and holding temperatures may vary from 30° F. to 100° F.; however, it is to be understood that the processes of this invention achieve the heretofore set out advantages regardless of these variables in the preparation of the meat products.

Example 7

The procedure of Example 6 was repeated using ¾ ounce of various mixtures of sodium erythorbate and sodium citrate per 100 pounds of meat. The mixtures used and the results are shown in Table 7.

TABLE 7

| | Citrate, percent | Munsell Color Values | | | |
|---|---|---|---|---|---|
| | | Red | Yellow | White | Black |
| Erythorbate, percent: | | | | | |
| 100 | 0 | 62 | 5 | 14 | 19 |
| 90 | 10 | 60 | 5 | 16 | 19 |
| 80 | 20 | 65 | 5 | 16 | 14 |
| 70 | 30 | 63 | 4 | 16 | 17 |
| 60 | 40 | 61 | 4 | 18 | 17 |
| 50 | 50 | 62 | 5 | 18 | 15 |
| 40 | 60 | 62 | 5 | 17 | 16 |
| 30 | 70 | 60 | 4 | 20 | 16 |
| 20 | 80 | 56 | 5 | 22 | 17 |
| 10 | 90 | 57 | 4 | 20 | 19 |
| 0 | 100 | 57 | 6 | 18 | 19 |
| 0 | 0 | 54 | 7 | 18 | 21 |

These data show that the use of a mixture of an ascorbate with a citrate in proportions ranging from 20% to 70% citrate results in markedly improved color development. Below 20% citrate the color contains too much black. Above 70% citrate the color contains too little red and too much black.

In summary this invention provides a process for the preparation of cooked, cured, comminuted meat products which comprises maintaining intimate contact with a mixture of an ascorbate and a citrate throughout the curing and cooking cycles. This process results in the production of an optimum color in a shorter time than was previously possible as well as the maintenance of this color for longer periods of time during storage and display of the resulting cooked, cured, comminuted meat products.

We claim:

1. A process for accelerating color development and improving the color of meat in a comminuted meat product which consists of mixing with comminuted meat a mixture of an ascorbate selected from the group consisting of ascrobic acid, erythorbic acid and the water soluble salts thereof and a citrate selected from the group consisting of citric acid and the water soluble salts thereof in addition to the usual curing salts and flavoring agents, said mixture being added in a concentration of about from 0.03% to 0.07% by weight of said meat, said mixture containing about from 30% to 80% of an ascorbate and about from 20% to 70% of a citrate, and smoking the meat containing said mixture.

2. A process according to claim 1 wherein the ascorbate is sodium erythorbate and the citrate is sodium citrate.

3. A process according to claim 1 wherein the ascorbate and citrate are present in substantially equal parts by weight.

References Cited

UNITED STATES PATENTS 2,553,533   5/1951   Komarik et al. _____ 99—159

HYMAN LORD, Primary Examiner

U.S. Cl. X.R.

99—108, 109, 222